(12) United States Patent
Lim et al.

(10) Patent No.: US 8,483,147 B2
(45) Date of Patent: Jul. 9, 2013

(54) METHOD AND APPARATUS FOR TRANSMITTING FEEDBACK INFORMATION

(75) Inventors: Kwang-Jae Lim, Daejeon (KR); Chul-Sik Yoon, Seoul (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 649 days.

(21) Appl. No.: 12/376,568

(22) PCT Filed: Jul. 31, 2007

(86) PCT No.: PCT/KR2007/003673
§ 371 (c)(1),
(2), (4) Date: Feb. 5, 2009

(87) PCT Pub. No.: WO2008/018711
PCT Pub. Date: Feb. 14, 2008

(65) Prior Publication Data
US 2010/0189049 A1    Jul. 29, 2010

(30) Foreign Application Priority Data

Aug. 10, 2006  (KR) .................. 10-2006-0075874
Feb. 2, 2007   (KR) .................. 10-2007-0010952

(51) Int. Cl.
*H04W 4/00* (2009.01)
(52) U.S. Cl.
USPC ..................... 370/329; 370/229; 455/450
(58) Field of Classification Search
None
See application file for complete search history.

(56) References Cited

U.S. PATENT DOCUMENTS

| 2003/0087605 | A1 |   | 5/2003  | Das et al.   |         |
|--------------|----|---|---------|--------------|---------|
| 2005/0201474 | A1 |   | 9/2005  | Cho et al.   |         |
| 2005/0281226 | A1 |   | 12/2005 | Lee et al.   |         |
| 2006/0120470 | A1 | * | 6/2006  | Hwang et al. | 375/260 |
| 2008/0069031 | A1 | * | 3/2008  | Zhang et al. | 370/328 |
| 2009/0257395 | A1 | * | 10/2009 | Jin et al.   | 370/329 |
| 2010/0118824 | A1 | * | 5/2010  | Ihm et al.   | 370/329 |
| 2010/0254339 | A1 | * | 10/2010 | Ihm et al.   | 370/329 |

FOREIGN PATENT DOCUMENTS

| KR | 10-2006-0074795 A | 7/2006 |
| KR | 10-2006-0082016 A | 7/2006 |
| WO | 2006/019263 A2    | 2/2006 |
| WO | 2006/043773 A2    | 4/2006 |
| WO | 2006/071052 A1    | 7/2006 |

OTHER PUBLICATIONS

IEEE Standard for Local and Metropolitan Area Networks, Part 16: Air Interface for Fixed and Mobile Broadband Wireless Access Systems/Amendment 2: Physical and Medium Access Control Layers for Combined Fixed and Mobile Operation in Licensed Bands and Corrigendum 1, IEEE Std 802.16e-2005 and IEEE Std 802.16-2004/Cor1-2005, New York, NY, Feb. 28, 2006.

* cited by examiner

*Primary Examiner* — Chi Pham
*Assistant Examiner* — Mohammad Adhami
(74) *Attorney, Agent, or Firm* — Jefferson IP Law, LLP

(57) ABSTRACT

Disclosed are methods for transmitting feedback information, comprising receiving channel allocation information (S100) that includes classification information, information on a plurality of transmission periods, and information on the number of a plurality of tiles, in accordance with the channel allocation information (S110), multiplexing a plurality of payloads (S130) so as to create a plurality of tile groups, then, multiplexing the plurality of tile groups on the basis of the information on the number of the plurality of tiles so as to create a multiplexed tile group.

14 Claims, 10 Drawing Sheets

P200
Feedback channel allocation {

Start frame index: Uplink frame number from which feedback channel starts ~P101

Number of payload classes (C): Number of feedback payload classes ~P103

P105 — for c = 1 to c ≤ C {

Power offset ($\Delta P_c$): Power offset used for payload class c ~P107

Number of tiles ($N_c$): Number of tiles used for payload class c ~P109

Number of payloads (I): Number of payloads multiplexed with payload class c~P111

P113 — for t = 1 to t ≤ I {

Payload type ($PL_{c,t}$): Type of payload ~P115

Period ($T_{c,t}$): Payload feedback period ~P117

}

}

}

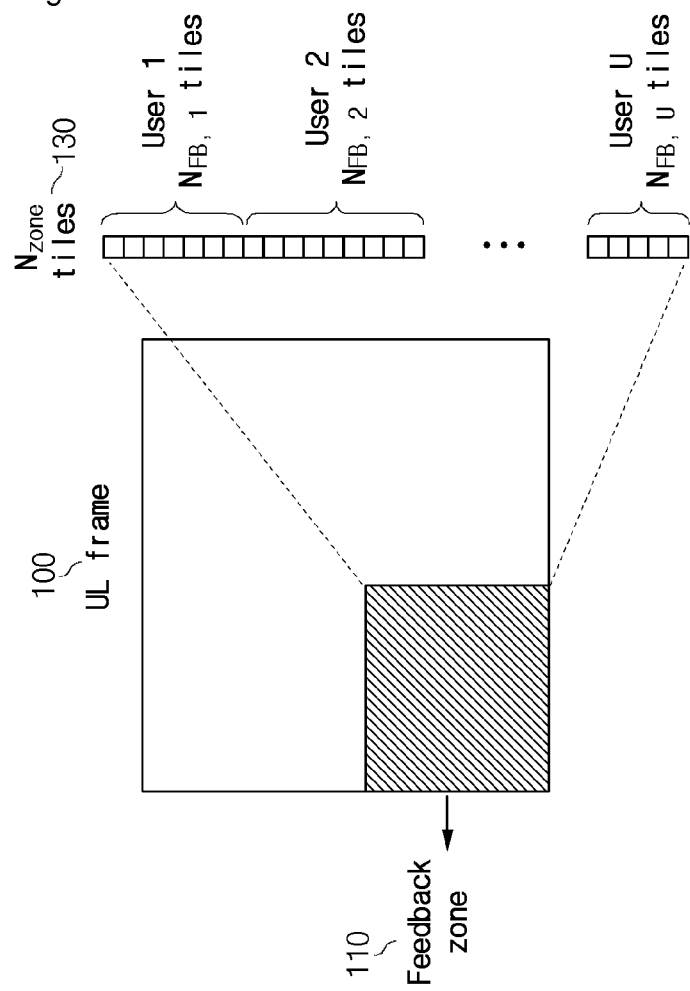

Fig. 4

```
                         P100
Feedback channel allocation {

Start frame index: Uplink frame number from which feedback channel starts  ~P101

Number of payload classes (C): Number of feedback payload classes  ~P103

P105~ for c = 1 to c ≤ C {

Power offset (ΔP_c): Power offset used for payload class c  ~P107

Number of tiles (N_c): Number of tiles used for payload class c  ~P109

Number of payloads (I): Number of payloads multiplexed with payload class c ~P111

P113~  for t = 1 to t ≤ I {

Payload type (PL_{c,t}): Type of payload  ~P115

Period (T_{c,t}): Payload feedback period  ~P117

}

}

Tile bitmap: Bitmap informing locations of tiles used for feedback channel  ~P119

}
```

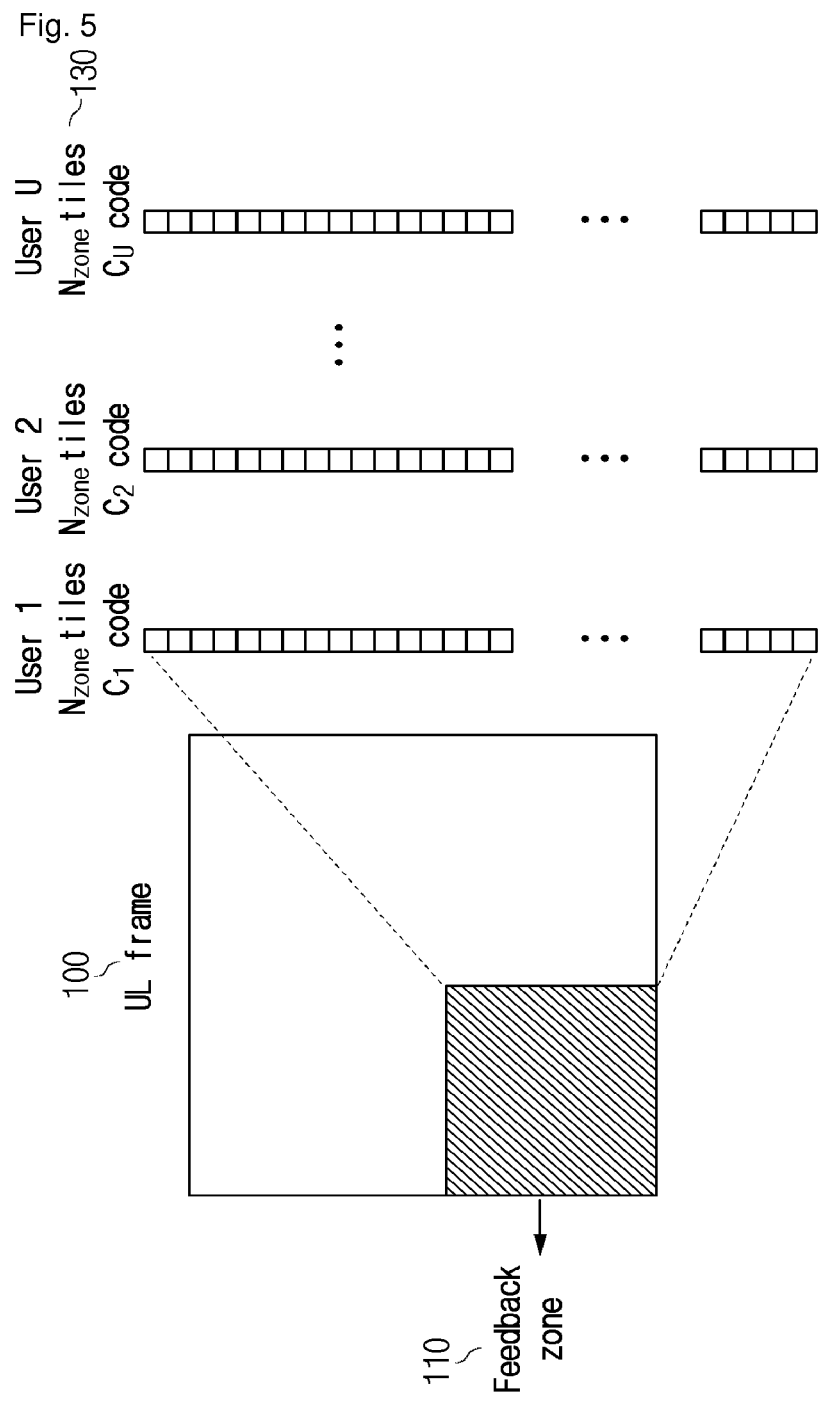

Feedback channel allocation {

Start frame index: Uplink frame number from which feedback channel starts ~P101

Number of payload classes (C): Number of feedback payload classes ~P103

P105~ for c = 1 to c ≤ C {

Power offset ($\Delta P_c$): Power offset used for payload class c ~P107

Number of tiles ($N_c$): Number of tiles used for payload class c ~P109

Number of payloads (I): Number of payloads multiplexed with payload class c ~P111

P113~ for t = 1 to t ≤ I {

Payload type ($PL_{c,t}$): Type of payload ~P115

Period ($T_{c,t}$): Payload feedback period ~P117

}

}

}

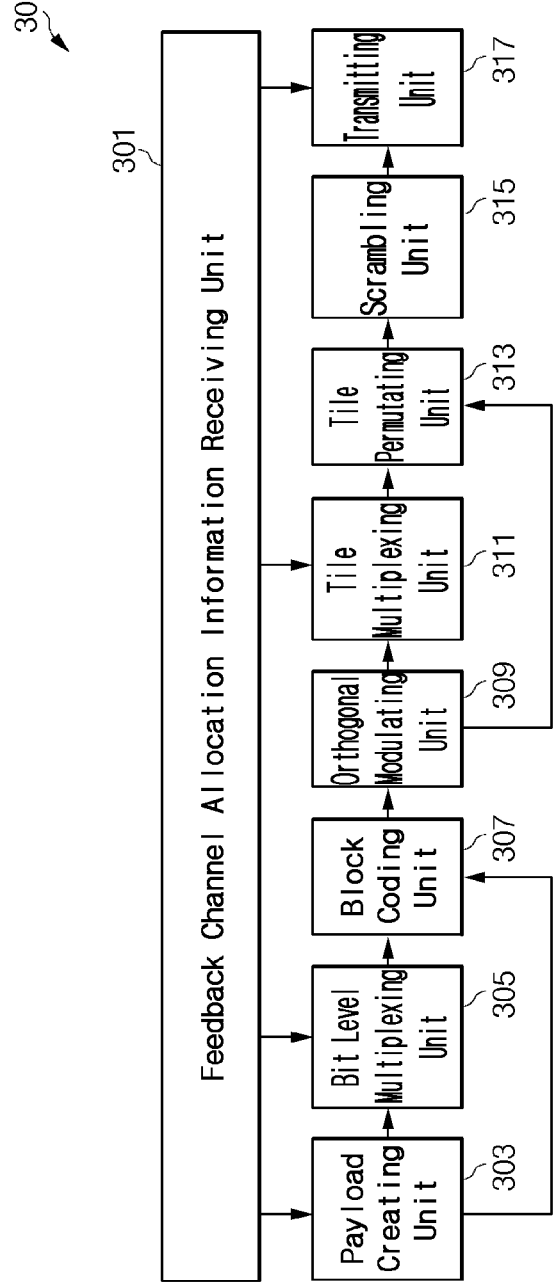

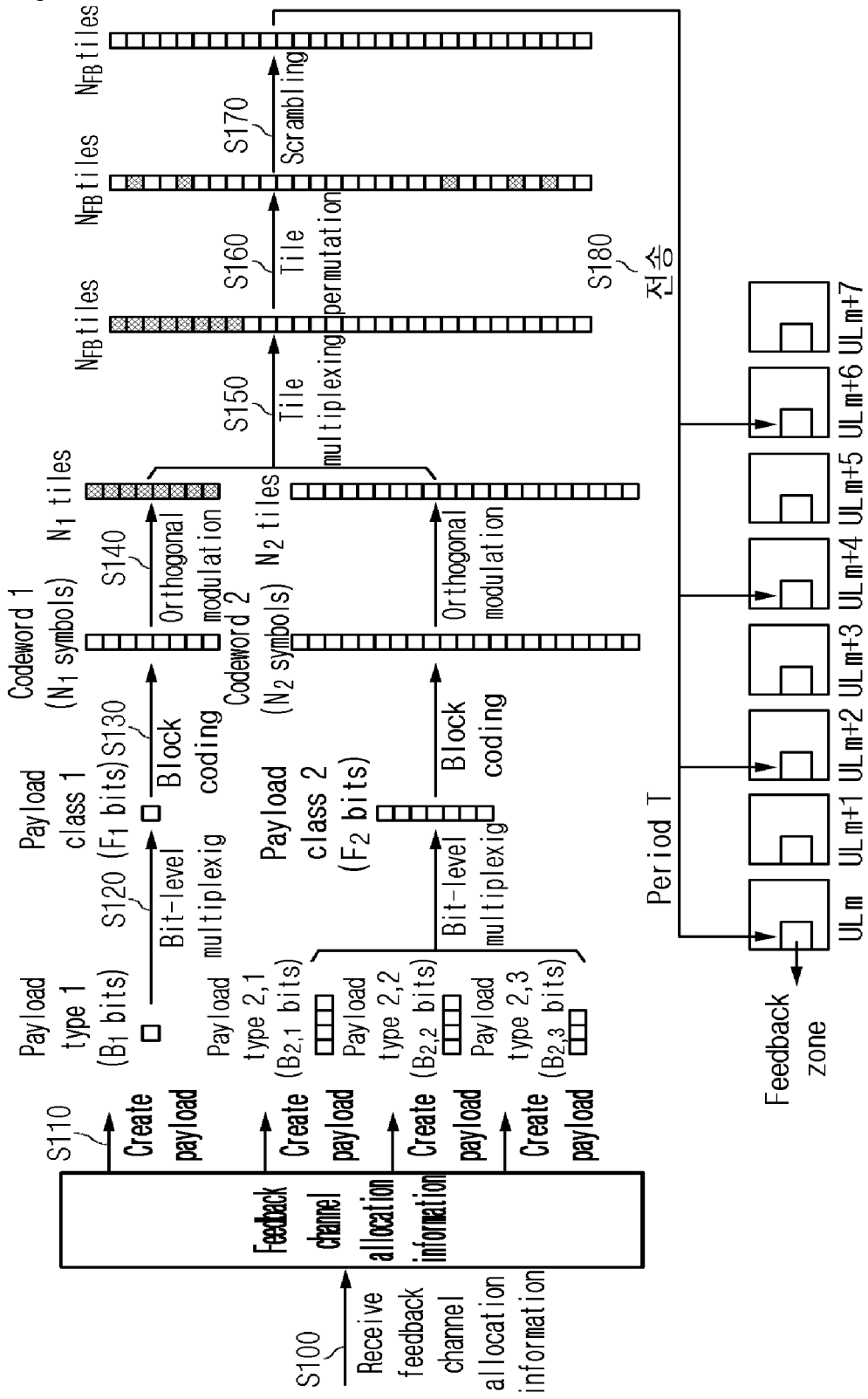

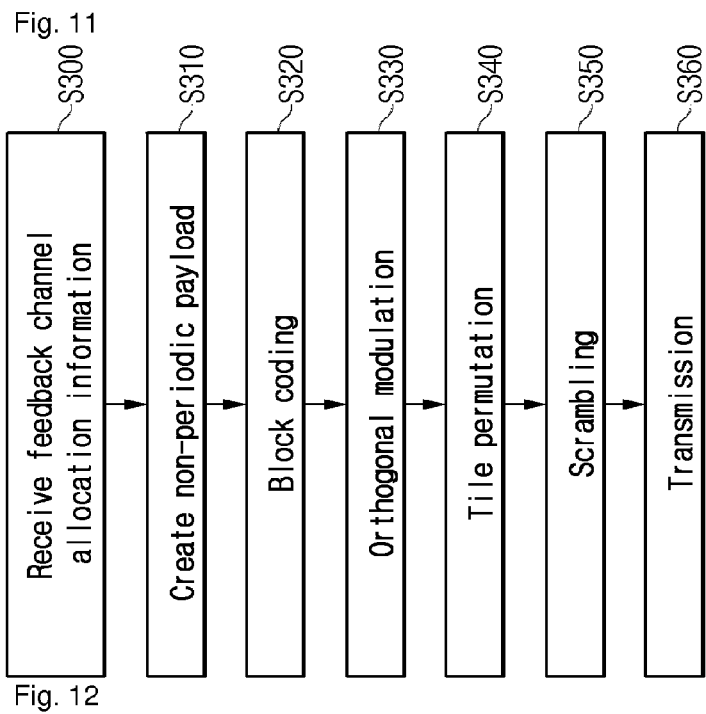
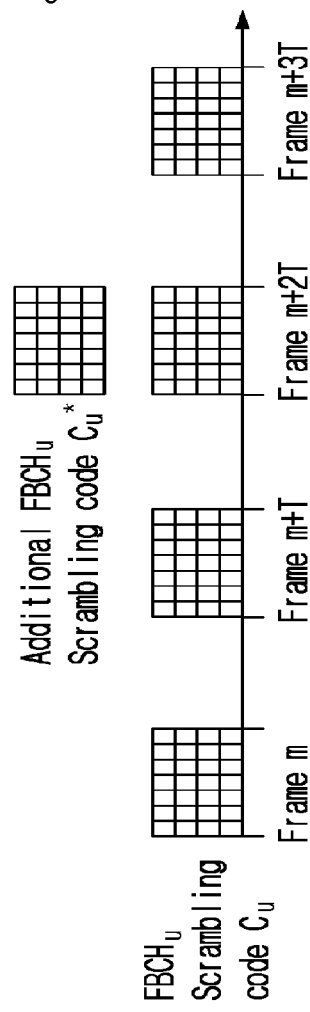

METHOD AND APPARATUS FOR TRANSMITTING FEEDBACK INFORMATION

TECHNICAL FIELD

The present invention relates a method and apparatus for transmitting feedback information. In particular, the present invention relates to a method and apparatus for adaptively transmitting feedback information according to a channel environment of a mobile terminal.

BACKGROUND ART

The IEEE 802.16 has formulated a standard for an OFDMA mobile communication. According to the standard that is formulated by the IEEE 802.16, mobile terminals periodically transmit feedback information to a base station through a feedback channel (Feedback) of an uplink. The mobile terminals feed back information including channel quality information, information for multiple antenna transmissions, and base station selection information to the base station. On the basis of the feedback information, the base station performs packet scheduling, setting an adaptive modulation and coding scheme, setting an antenna weight in multiple antenna transmissions, and a high-speed handoff.

At this time, in order to discriminate contents that are indicated by a payload, it is required to transmit a payload that is composed of bits larger than bits that are needed to represent the payload contents.

As in the case of the multiple antenna transmissions, when a large amount of feedback information is required, a plurality of feedback channels need to be allocated to one mobile terminal.

Since a feedback channel having the same radio resource and the same data transmission rate is used regardless of a channel environment of a mobile terminal, it is not possible to efficiently use the radio resource for the feedback channel.

If the same radio resource, the same data transmission rate, and the same transmission power are used regardless of feedback types, it is not possible to apply a different function according to feedback contents.

Further, a periodic feedback channel needs to be allocated for use in feedback information from which intermittent feedback is required.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method and apparatus for adaptively transmitting feedback information according to a channel environment of a mobile terminal.

Technical Solution

An exemplary embodiment of the present invention provides a method of transmitting feedback information. The method includes receiving channel allocation information that includes classification information for classifying a plurality of payloads corresponding to feedback information into a plurality of classes, information on a plurality of transmission periods corresponding to each of the plurality of payloads, and information on the number of a plurality of tiles corresponding to each of the plurality of classes, multiplexing the plurality of payloads for each of the plurality of classes in accordance with the classification information, the information on the plurality of transmission periods, and the information on the number of the plurality of tiles that are included in the channel allocation information to created a plurality of tile groups corresponding to each of the plurality of classes for periods of the plurality of classes according to the plurality of transmission periods, multiplexing the plurality of tile groups on the basis of the periods of the plurality of classes and the information on the number of the plurality of tiles to create a multiplexed tile group for each of feedback periods according to the periods of the plurality of classes, and transmitting the multiplexed tile group to a base station through a feedback zone of a frame that corresponds to the feedback periods.

Another exemplary embodiment of the present invention provides a method of transmitting feedback information. The method includes receiving channel allocation information that includes classification information for classifying a plurality of payloads corresponding to feedback information into a plurality of classes, information on a plurality of transmission periods corresponding to each of the plurality of payloads, information on the number of a plurality of tiles corresponding to each of the plurality of classes, and bitmap information indicating locations of the tiles, creating the plurality of payloads for the plurality of transmission periods, multiplexing the plurality of payloads for the plurality of classes in accordance with the classification information, the information on the plurality of transmission periods, and the information on the number of the plurality of tiles that are included in the channel allocation information, to created a plurality of tile groups corresponding to each of the plurality of classes for periods of the plurality of classes according to the plurality of transmission periods, multiplexing the plurality of tile groups on the basis of the periods of the plurality of classes and the information on the number of the plurality of tiles to created a multiplexed tile group for each of feedback periods, and transmitting the multiplexed tile group to a base station through the tiles according to the bitmap information in a feedback zone of a frame that corresponds to the feedback periods.

The method may further include applying a channel code to the multiplexed tile group, transmitting the multiplexed tile group to which the channel code is applied to the base station through a portion of tiles of the feedback zone according to the bitmap information in the feedback zone of the frame that corresponds to the feedback periods, the plurality of payloads including a non-periodic payload in which a value indicating a transmission period is not constant wherein a class to which the non-periodic payload belongs is a non-periodic class, performing block coding on the non-periodic payload so as to create a non-periodic codeword, performing orthogonal modulation on the non-periodic codeword according to the information on the number of tiles corresponding to the non-periodic class so as to create a non-periodic tile group, applying an additional channel code that is obtained by performing conjugation or symbol inversion on the channel code to the non-periodic tile group, and transmitting the non-periodic tile group to which the additional channel code is applied to the base station through a portion of the feedback zone in accordance with the bit map information in the feedback zone of the frame that corresponds to the feedback periods.

Yet another exemplary embodiment of the present invention provides a method of transmitting feedback information.

The method includes receiving channel allocation information that includes classification information for classifying a plurality of payloads corresponding to feedback information into a plurality of classes, information on a plurality of transmission periods corresponding to each of the plurality of payloads, and information on the number of a plurality of tiles corresponding to each of the plurality of classes, creating the plurality of payloads for the plurality of transmission periods, multiplexing the plurality of payloads for each of the plurality of classes in accordance with the classification information, the information on the plurality of transmission periods, and the information on the number of the plurality of tiles that are included in the channel allocation information, to created a plurality of tile groups corresponding to each of the plurality of classes for periods of the plurality of classes according to the plurality of transmission periods, multiplexing the plurality of tile groups on the basis of the periods of the plurality of classes and the information on the number of the plurality of tiles to created a multiplexed tile group for each of feedback periods, applying a channel code to the multiplexed tile group, and transmitting the multiplexed tile group to which the channel code is applied to a base station through a feedback zone of a frame that corresponds to the feedback periods.

The method may further include performing block coding on a non-periodic payload so as to create a non-periodic codeword, the plurality of payloads including the non-periodic payload in which a value indicating a transmission period is not constant, a class to which the non-periodic payload belongs being a non-periodic class, performing orthogonal modulation on the non-periodic codeword in accordance with the information on the number of tiles that corresponds to the non-periodic class to created a non-periodic tile group, applying an additional channel code that is obtained by performing conjugation or symbol inversion on the channel code to the non-periodic tile group, and transmitting the non-periodic tile group to which the additional channel code is applied to the base station through the feedback zone of the frame that corresponds to the feedback periods.

The method may further include setting a transmission power for each of the plurality of classes according to information on a plurality of transmission powers. The channel allocation information may further include the information on the plurality of transmission powers that correspond to each of the plurality of classes.

The multiplexing of the plurality of payloads may further include multiplexing the plurality of payloads for each of the plurality of classes according to the classification information, to created a plurality of multiplexing payloads corresponding to each of the plurality of classes for periods of the plurality of classes, performing block coding on each of the plurality of multiplexing payloads so as to create a plurality of codewords, and performing orthogonal modulation on each of the plurality of codewords in accordance with the information on the number of the plurality of tiles so as to create a plurality of tile groups.

The method may further include determining each of the periods of the plurality of classes as a minimum value among transmission periods of at least one of the payloads that belong to each of the plurality of classes.

The multiplexing of each of the plurality of classes may further include determining the number of bits by which each payload belonging to each class is to be transmitted for each period of each class on the basis of a transmission period of at least one of the payloads belonging to each class and a period of each class, and merging bits corresponding to the number of bits of each payload among one or more bits constituting each payload belonging to each class for each class to created a multiplexed payload.

In the determining of the number of bits, the number of bits may be determined by a ratio between a transmission period of at least one of the payloads belonging to each class and a period of each class.

The method may further include determining the feedback period as a minimum value among the periods of the plurality of classes.

The creating of the multiplexed tile group may include determining the number of tiles used by each tile group for each feedback period on the basis of a period of each class and the information on the number of tiles for each class, and merging tiles corresponding to the number of tiles used by each tile group among tiles constituting each tile group for each feedback period so as to create the multiplexed tile group for each feedback period.

In the determining of the number of tiles, the number of tiles may be determined by a ratio between a period of each class and the feedback period.

The feedback zone may include a plurality of tiles, and each tile may include a plurality of symbols on a time axis and a plurality of subcarriers on a frequency axis.

BRIEF DESCRIPTION OF THE DRAWINGS

FIG. 3 is a view illustrating frequency/time multiplexing for feedback channels of a plurality of mobile terminals according to an exemplary embodiment of the present invention.

FIG. 4 is a view illustrating feedback channel allocation information in a case of performing frequency/time multiplexing according to an exemplary embodiment of the present invention.

FIG. 5 is a view illustrating a case where a plurality of mobile terminals according to an exemplary embodiment of the present invention perform code multiplexing on feedback channels.

FIG. 6 is a view illustrating feedback channel allocation information in a case of performing code multiplexing according to an exemplary embodiment of the present invention.

FIG. 7 is a block diagram illustrating a mobile terminal according to an exemplary embodiment of the present invention.

FIG. 8 is a flowchart illustrating a method in which a mobile terminal according to an exemplary embodiment of the present invention transmits a plurality of payloads.

FIG. 11 is a flowchart illustrating a method in which a mobile terminal according to an exemplary embodiment of the present invention transmits a non-periodic payload.

FIG. 12 is a view illustrating a method in which a mobile terminal according to an exemplary embodiment of the present invention transmits a non-periodic payload through an additional feedback channel.

MODE FOR THE INVENTION

Figure 1:
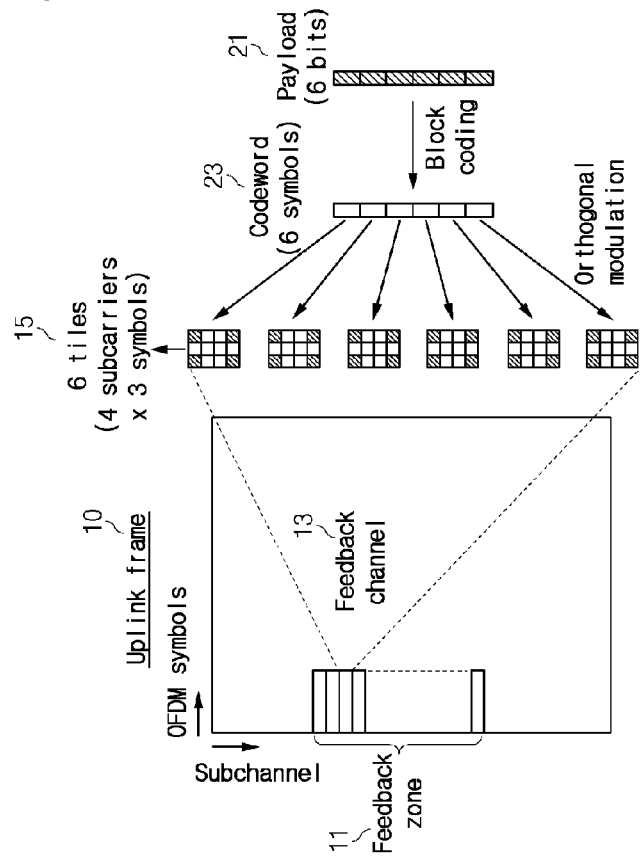
FIG. 1 is a view illustrating an uplink feedback channel according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Further, in describing the present invention, when the specific description of the related known technology departs from the scope of the present invention, the detailed description of the corresponding known technology will be omitted.

A method and apparatus for transmitting feedback information according to an exemplary embodiment of the present invention will now be described in detail with reference to the accompanying drawings.

Referring to FIG. 1, an uplink feedback channel according to an exemplary embodiment of the present invention will be described.

FIG. 1 is a view illustrating an uplink feedback channel according to an exemplary embodiment of the present invention.

As shown in FIG. 1, a base station allocates a part of a radio resource of an uplink frame 10, which includes a plurality of subchannels on a frequency axis and a plurality of OFDM symbols on a time axis, to a feedback zone 11 for a feedback channel 13. At this time, the feedback zone 11 is divided into a plurality of feedback channels 13, each feedback channel 13 includes six tiles 15, and each tile 15 includes four subcarriers and three symbols.

The base station transmits feedback channel allocation information, which includes an index and a report period of a feedback channel 13 used by each mobile terminal, to each mobile terminal through a map, and allocates the feedback channel 13 to each mobile terminal. At this time, when a large amount of feedback information is fed back, the base station allocates the plurality of feedback channels 13 to one mobile terminal.

Each mobile terminal transmits the feedback information to the base station by using the feedback channels that are allocated to each mobile terminal. The feedback information is represented by a feedback payload (hereinafter, referred to as "payload") 21 that is composed of a plurality of bits. In the standard of IEEE 802.16, the payload 21 may be composed of 6 bits. The mobile terminal performs block coding on the payload 21 to be transmitted so as to create a codeword 23 that is composed of six symbols. In addition, after the mobile terminal performs orthogonal modulation on each of the six symbols of the codeword, the mobile terminal transmits them through the six tiles 15 that constitute each of the feedback channels allocated to each mobile terminal.

The mobile terminal represents various types of feedback information according to the contents of a sequence of bits that constitute the payload. For example, when a first bit is 0 in the payload that is composed of 6 bits, the remaining 5 bits may represent channel quality information (Channel Quality Indication, CQI), and when the first bit is 1, the remaining 5 bits may represent feedback information other than the CQI according to the contents of the remaining 5 bits. Accordingly, if necessary, instead of the channel quality information, a command requiring changing a multiple antenna transmission method, channel status information for multiple antenna transmissions, or antenna weight value information may be transmitted through the allocated feedback channels. Further, when a base station selection index is transmitted to perform high-speed handoff, one of eight different bit sequences, in which the first bit is 1, may be selected to represent the corresponding base station.

Next, referring to FIG. 2, a feedback zone of an uplink frame according to an exemplary embodiment of the present invention will be described.

Figure 2:
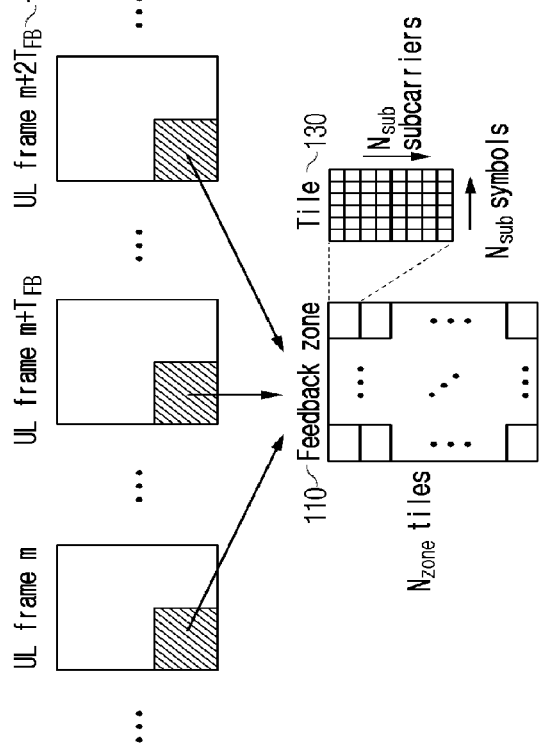
FIG. 2 is a view illustrating a feedback zone of an uplink frame according to an exemplary embodiment of the present invention.

FIG. 2 is a view illustrating a feedback zone of an uplink frame according to an exemplary embodiment of the present invention.

The base station designates a feedback zone 110 for a feedback channel in an uplink frame (UL frame) 100 through a broadcasting channel or a map transmitted in a downlink frame. At this time, the base station may transmit a message including feedback channel allocation information to the mobile terminal by using a downlink data burst or transmit a map in which the feedback channel allocation information is included, thereby allocating the feedback channels.

As shown in FIG. 2, the feedback zone 110 may be included in all of the uplink frames 100, or in order to reduce an overhead that is occupied by the feedback zone 110, intervals of the uplink frames 100 that include the feedback zone 110 may become several uplink frames 100. In FIG. 2, one feedback zone 110 exists per $T_{FB}$ uplink frames 100. When the uplink frames 100 including the feedback zone 110 are defined at intervals of several uplink frames 100, a minimum period of the feedback channels that are allocated to each mobile terminal is limited to a period of the uplink frames 100 included in the feedback zone 110.

The feedback zone 110 includes $N_{zone}$ tiles 130, and each tile includes $N_{sub}$ continuous subcarriers on a frequency axis and $N_{sym}$ continuous OFDM symbols in a time domain. A structure of the tiles 130 that constitute the feedback zone 110 may be the same as or different from a structure of tiles for transmitting an uplink data burst. Since the detailed structure of the tile departs from the scope of the present invention, the description thereof will be omitted.

Next, referring to FIG. 3, a description is given to a method in which feedback channels for a plurality of mobile terminals are multiplexed by frequency/time multiplexing in a feedback zone 110.

FIG. 3 is a view illustrating frequency/time multiplexing for feedback channels of a plurality of mobile terminals according to an exemplary embodiment of the present invention.

As shown in FIG. 3, the $N_{zone}$ tiles in the feedback zone 110 are divided into a plurality of feedback channels for a plurality of mobile terminals and are allocated to each mobile terminal. That is, the feedback channels that are allocated to each mobile terminal are discriminated by using different tiles 130 in the feedback zone 110. At this time, the number of tiles that are used in the feedback channels allocated to each mobile terminal may be changed according to a channel condition of each mobile terminal and an amount of feedback information required. According to the channel condition of each mobile terminal and the amount of feedback information required, the base station adjusts the number of tiles used with respect to a payload per bit of the payload and transmission power of the feedback channels.

A feedback channel that is allocated to a certain mobile terminal User U includes $N_{FB,u}$ tiles 130. In FIG. 3, the tiles 130 that are allocated to each user are continuous. However, the tiles 130 shown in FIG. 3 mean logical tiles, and when the logical tiles are mapped as physical tiles actually transmitted in the uplink frame 100, the continuous logical tiles may be mapped such that they are separated from one another on the frequency and time axes. At this time, the mapping may be different according to a sector number and a frame number. Since a detailed process of mapping the tiles departs from the scope of the present invention, the description thereof will be omitted.

The base station transmits a feedback channel allocation message or a map in which the feedback channel allocation information is included to the mobile terminal requiring the feedback channel, and allocates the feedback channel to the mobile terminal.

Next, referring to FIG. 4, a description is given to the feedback channel allocation information that the base station transmits to each mobile terminal when the feedback channels are multiplexed by frequency/time multiplexing.

FIG. 4 is a view illustrating feedback channel allocation information in a case of performing frequency/time multiplexing according to an exemplary embodiment of the present invention.

As shown in FIG. 4, when performing frequency/time multiplexing, feedback channel allocation information P100 includes a number of an uplink frame where the feedback channel starts P101, the number of payload classes P103, at least one of the payload class information P105, and a bit map that informs the locations of tiles 130 that are used for the feedback channels P119. At this time, the payload class information P105 includes a power offset that is used for each payload class P107, the number of tiles that are to be used for each payload class P109, the number of payloads that are to be multiplexed with each payload class P111, and payload information P113 that belongs to each payload class. The payload information P113 includes types of payloads P115 that belong to each payload class and feedback periods P117 of payloads that belong to each payload class.

As shown in FIG. 4, the base station allocates one feedback channel to each mobile terminal, and each mobile terminal multiplexes various types of payloads and transmits them to the base station. A feedback channel that is allocated to a certain mobile terminal may include at least one of the payload classes, and each payload class may include at least one of the payloads.

The payloads that are multiplexed with one payload class are determined according to the types of payloads P115 of payload information P113. For each type of the payloads P115, the number of bits $B_{c,t}$ that constitute a payload and meaning of the bits are defined in advance. A report period of payloads that are multiplexed with one payload class is defined according to a feedback period $T_{c,t}$ of payloads P117 that are included in the payload information P113, and are multiplexed with one feedback payload class according to a feedback period $T_{c,t}$ of payloads P117 that are multiplexed with one payload class.

At this time, payloads that need the same process gain and the same transmission power are multiplexed with one payload class. Further, payloads that belong to the same payload class are multiplexed to have the same reception performance, but are multiplexed to have different feedback periods.

The payload classes use different tiles 130. The payload classes may be allocated with different transmission power and have different process gains according to the number of tiles allocated. The process gain means the number of sub-carriers used for each payload bit. If a payload class feeds $F_c$ bits back in an uplink frame and is allocated with $N_c$ tiles according to the number of tiles P109 included in the feedback channel allocation information P100, a process gain $PG_c$ of the payload class is in accordance with Equation 1.

$$PG_c = N_c N_{sub} N_{sym} / F_c \quad \text{(Equation 1)}$$

In accordance with Equation 1, if the process gain $PG_c$ is large, a radio resource used for each bit is large, and a detection performance of the payloads in the base station is improved.

Further, if the transmission power of the payload class is relatively larger than the transmission powers of different payload classes, a detection performance of payloads of the corresponding payload class is high. The mobile terminal determines the transmission power of each payload class on the basis of a power offset of each payload class P107 with respect to a reference transmission power of the feedback channel that is allocated to each mobile terminal. If the reference transmission power of the feedback channel of the mobile terminal is $P_{FB}$ and the power offset of the payload class P107 is $DP_c$, the transmission power $P_c$ in the tiles that are used for the payload class is in accordance with Equation 2.

$$P_C = P_{FB} + \Delta F_c \quad \text{(Equation 2)}$$

The reference transmission power of the feedback channel of the mobile terminal is determined according to open-loop power control or closed-loop power control. Since a method of setting the reference transmission power departs from the scope of the present invention, the detailed description thereof will be omitted.

As such, a different process gain and a different transmission power are allocated to each payload class, thereby enabling each payload class to have a different reception performance. For example, channel quality information and a response for an HARQ (Hybrid Automatic Repeat Request) burst may be defined by a different payload class, and a relatively large amount of subcarriers and transmission power per bit may be allocated so as to have a high reception performance with respect to the response for the HARQ burst.

The base station informs locations of the tiles 130, which a feedback channel of a certain mobile terminal uses in the feedback zone 110, through a bit map P119 of the feedback channel allocation information P100. The number of bits that constitute the tile bit map P119 is the same as the number of tiles that constitute the feedback zone, and the n-th bit means the n-th tile. In this case, a tile number n denotes a number of a logical tile. Even when tiles have continuous numbers, locations of physical tiles that are actually used at the time of transmission may not be continuous, and may be distant from each other on the frequency and time axes.

The number of tiles that a feedback channel allocated to a mobile terminal uses corresponds to the number of tiles that are used by all payload classes of the mobile terminal. In order to sequentially transmit the payload classes, the mobile terminal uses tiles that are allocated to the feedback channel according to an order in which the payload classes are defined in the feedback channel allocation information and the number of tiles allocated.

Next, referring to FIG. 5, a description is given to a method of multiplexing feedback channels for a plurality of mobile terminals by using code multiplexing in a feedback zone 110.

FIG. 5 is a view illustrating code multiplexing for feedback channels of a plurality of mobile terminals according to an exemplary embodiment of the present invention.

As shown in FIG. 5, the feedback channels that are allocated to the mobile terminal use all of the $N_{zone}$ tiles 130 of the feedback zone 110, and each feedback channel is discriminated by a scrambling code. According to the channel condition of each mobile terminal and the amount of feedback information required, the base station adjusts the number of tiles used with regard to the feedback payload per bit of the feedback payload and transmission power of the feedback channels.

Next, referring to FIG. 6, the description is given to feedback channel allocation information that the base station transmits to each mobile terminal when the feedback channels are multiplexed by code multiplexing.

FIG. 6 is a view illustrating feedback channel allocation information in a case of performing code multiplexing according to an exemplary embodiment of the present invention.

As shown in FIG. 6, when performing code multiplexing, feedback channel allocation information P200 includes a number of an uplink frame where a feedback channel starts P101, the number of payload classes P103, and at least one of the payload class information P105. The payload class information P105 includes a power offset that is used for each payload class P107, the number of tiles that are to be used for each payload class P109, the number of payloads that are to be multiplexed with each payload class P111, and payload information that belongs to each payload class P113. The payload information P113 includes types of payloads P115 that belong to each payload class and feedback periods of payloads P117 that belong to each payload class.

In the case of code multiplexing, when the feedback channel allocation information P200 is subjected to frequency/time multiplexing, a portion of the feedback channel allocation information P200 that is different from the feedback channel allocation information P100 does not include a bit map P119. In the case of code multiplexing, since the feedback channel that is allocated to each mobile terminal uses all of the tiles 130 in the feedback zone 110, locations of the tiles used do not need to be informed.

Next, referring to FIG. 7, a description is given to a mobile terminal according to an exemplary embodiment of the present invention.

FIG. 7 is a block diagram illustrating a mobile terminal according to an exemplary embodiment of the present invention.

As shown in FIG. 7, a mobile terminal 300 includes a feedback channel allocation information receiving unit 301, a payload generator 303, a bit level multiplexer 305, a block coding unit 307, an orthogonal modulating unit 309, a tile multiplexer 311, a tile permutating unit 313, a scrambling unit 315, and a transmitting unit 317.

The feedback channel allocation information receiving unit 301 receives the feedback channel allocation information P100 from the base station.

The payload generator 303 generates a plurality of payloads that correspond to feedback information according to payload information P113 of the feedback channel allocation information P100.

The bit level multiplexer 305 multiplexes the plurality of payloads that are generated by the payload generator 303 according to payload class information P105, and generates at least one multiplexing payload.

The block coding unit 307 converts at least one multiplexing payload and creates at least one codeword.

The orthogonal modulating unit 309 performs orthogonal modulation on at least one codeword and generates at least one orthogonally modulated codeword.

The tile multiplexer 311 performs multiplexing such that at least one orthogonally modulated codeword is transmitted over at least one frame, and creates tile multiplexing symbols for each feedback period.

The tile permutating unit 313 performs tile permutation on the tile permutating symbols and creates tile permutation symbols.

The scrambling unit 315 applies channel codes to the tile permutation symbols and creates channel code applying symbols.

The transmitting unit 317 transmits the channel code applying symbols to the base station.

Figure 9:
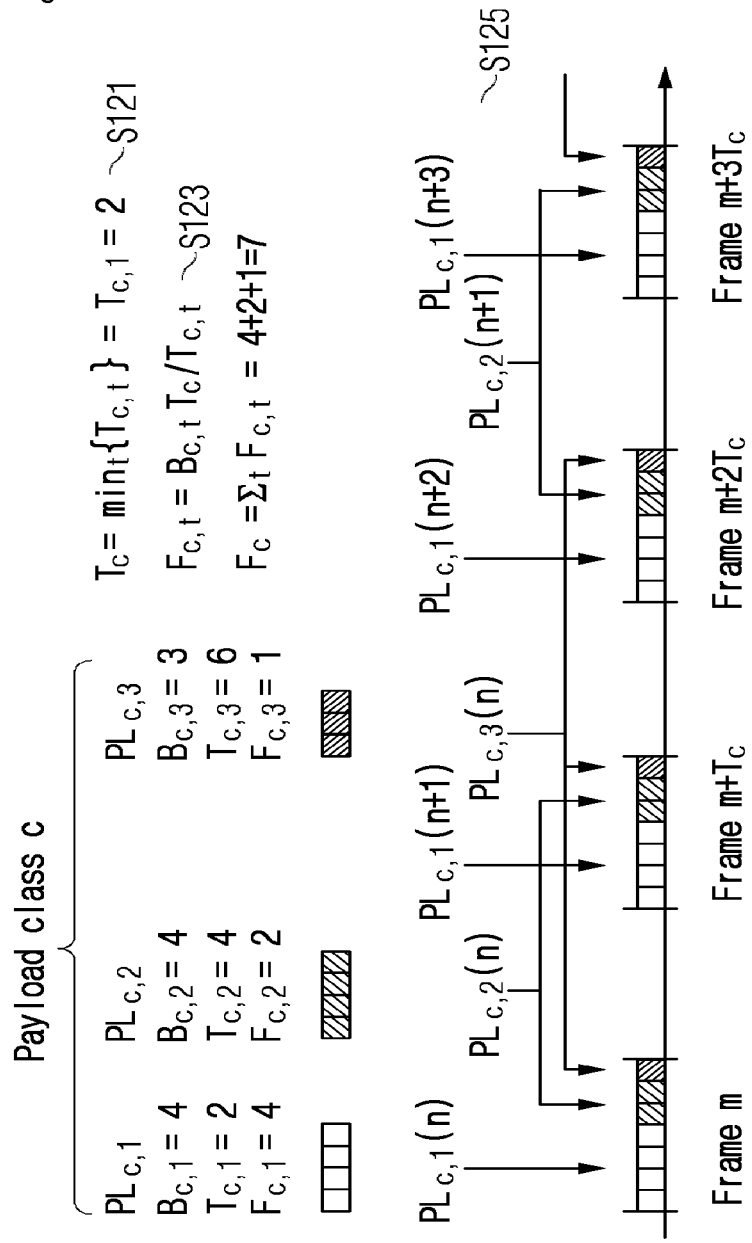
FIG. 9 is a flowchart illustrating a process in which a bit level multiplexing unit according to an exemplary embodiment of the present invention creates one multiplexing payload.
Figure 10:
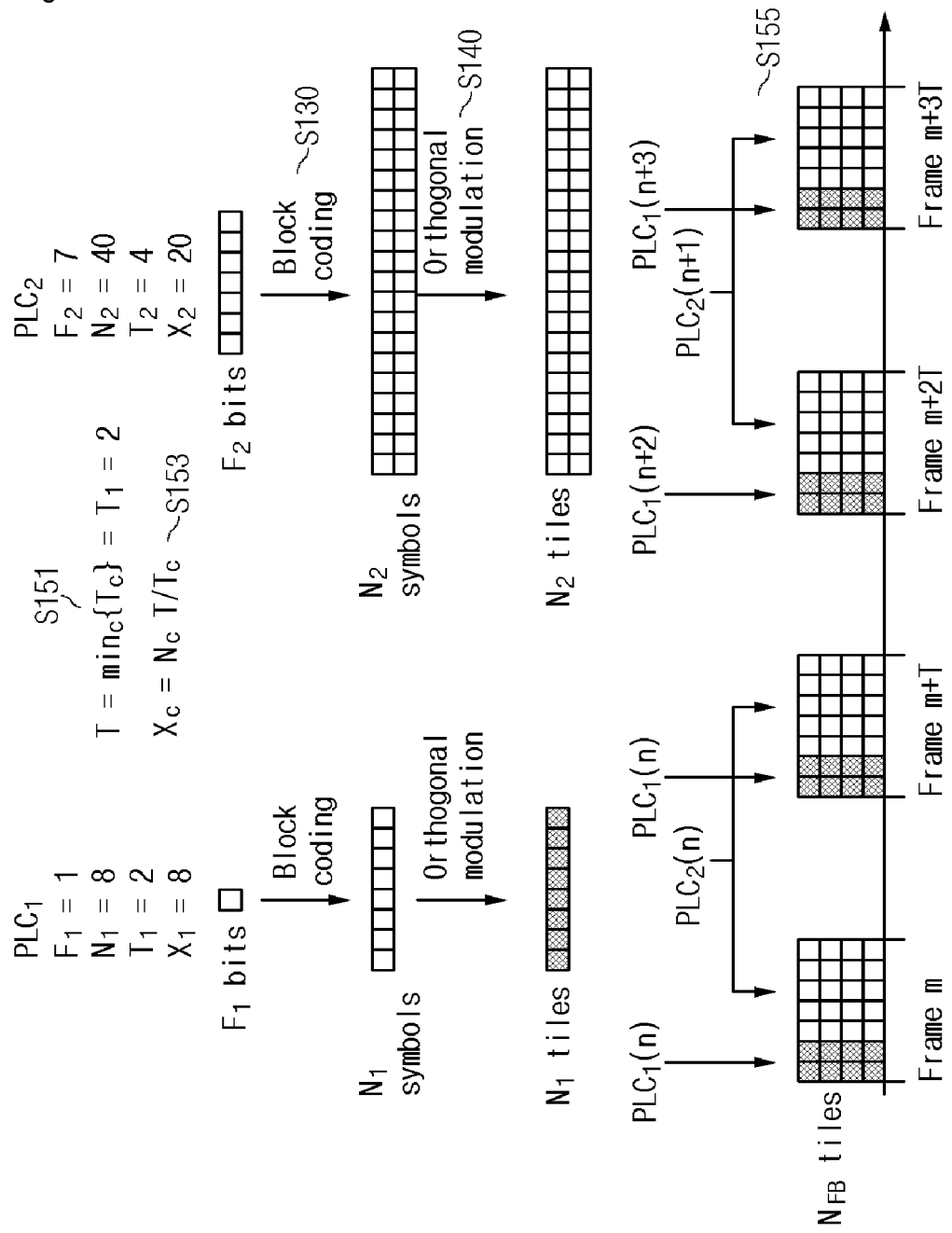
FIG. 10 is a flowchart illustrating a process in which a tile multiplexer according to an exemplary embodiment of the present invention creates a tile multiplexing symbol.

Next, referring to FIGS. 8, 9, and 10, a description is given to a method in which a mobile terminal according to an exemplary embodiment of the present invention transmits feedback information to a base station.

FIG. 8 is a flowchart illustrating a method in which a mobile terminal according to an exemplary embodiment of the present invention transmits a plurality of payloads.

As shown in FIG. 8, first, the feedback channel allocation information receiving unit 301 of the mobile terminal 300 receives the feedback channel allocation information P100 from the base station (Step S100).

Then, the payload generator 303 of the mobile terminal 300 creates a plurality of payloads that correspond to types of payloads P115 for each of feedback periods of the payloads P117 in accordance with the payload information P113 of the feedback channel allocation information P100 (Step S110).

Then, the bit level multiplexer 305 of the mobile terminal 300 performs bit level multiplexing on at least one of payloads that belong to each payload class for each payload class, and creates at least one of multiplexing payloads that corresponds to at least one of payload classes (Step S120). The bit level multiplexer 305 performs bit level multiplexing on the basis of a feedback period $T_{c,t}$ of each payload P117 and a bit length $B_{c,t}$ of each payload. The feedback period $T_{c,t}$ of each payload P117 is defined by the feedback channel allocation information P100 in advance, and the bit length $B_{c,t}$ of each payload is defined in advance according to a type $PL_{c,t}$ of each payload P115.

Referring to FIG. 9, a description is given to a process in which the bit level multiplexing unit 305 multiplexes a plurality of payloads $PL_{c,1}$, $PL_{c,2}$, and $PL_{c,3}$, which are classified as one payload class (payload class c), with one multiplexing payload.

FIG. 9 is a flowchart illustrating a process in which a bit level multiplexer according to an exemplary embodiment of the present invention creates one multiplexing payload.

As shown in FIG. 9, the bit level multiplexer 305 determines a period $T_c$ of a payload class c (Step S121). At this time, the period $T_c$ of the payload class may have a minimum value among feedback periods $T_c$ of payloads that belong to a payload class. That is, when a feedback period $T_{c,1}$ of a payload $PL_{c,1}$ is two frames, a feedback period $T_{c,2}$ of a payload $PL_{c,2}$ is four frames, and a feedback period $T_{c,3}$ of a payload $PL_{c,3}$ is six frames, the bit level multiplexer 305 determines a period $T_c$ of a payload class (payload class c) as two frames according to the feedback period $T_{c,1}$ of the payload $PL_{c,1}$.

Then, on the basis of the period $T_c$ of the payload class, the bit level multiplexer 305 determines the number of bits $F_{c,t}$ that each of the payloads belonging to the payload class transmits for each period of the payload class (Step S123). At this time, the number of bits $F_{c,t}$ is in accordance with Equation 3.

$$F_{c,t} = B_{c,t} T_c / T_{c,t} \quad \text{(Equation 3)}$$

In accordance with Equation 3, the number of bits $F_{c,1}$ of the payload $PL_{c,1}$ becomes 4, the number of bits $F_{c,2}$ of the payload $PL_{c,2}$ becomes 2, and the number of bits $F_{c,3}$ of the payload $PL_{c,3}$ becomes 1.

At this time, when one payload belongs to a payload class, the corresponding payload class is composed of a single type of payload. That is, a period of the payload class becomes a feedback period of the single payload, and a multiplexing payload of the payload class becomes the single payload.

When the base station allocates a feedback channel to a certain mobile terminal 300, the base station can set types $PL_{c,t}$ of payloads P115 belonging to the payload class and a feedback period $T_{c,t}$ of the payloads P117 such that the number of bits $F_{c,t}$ becomes a natural number. Further, when it is difficult for the base station to allocate the number of bits $F_{c,t}$ such that the number of bits $F_{c,t}$ becomes a natural number, the base station can define the corresponding payload as an independent payload class. At this time, the base station may allocate the number of bits $F_{c,t}$ such the number of bits $F_{c,t}$ does not become a natural number. In this case, the bit level multiplexer 305 may add '0' bits of $DB_{c,t}$ to the rear side of the bits that constitute the payload. The number of added bits $DB_{c,t}$ is in accordance with Equation 4.

$$\Delta B_{c,t} = \lceil B_{c,t} T_c / T_{c,t} \rceil T_c / T_{c,t} - B_{c,t} \quad \text{(Equation 4)}$$

In accordance with Equation 4, the bit level multiplexer 305 may add '0' bits of $DB_{c,t}$ to the payload of which the number of bits is $B_{c,t}$ so as to extend the corresponding payload to a payload composed of $B_{c,t}'$ bits, and then perform bit level multiplexing on the extended payload. At this time, the number of bits $B_{c,t}'$ in the extended payload is in accordance with Equation 5.

$$B'_{c,t} = B_{c,t} + \Delta B_{c,t} \quad \text{(Equation 5)}$$

Then, with respect to the payloads that belong to the payload class, the bit level multiplexer 305 merges bits corresponding to the number of bits $F_{c,t}$ of each payload among bits constituting each payload, and creates one multiplexing payload for each period $T_c$ of the payload class (Step S125).

In the first frame (Frame m), the bit level multiplexer 305 merges 4 ($F_{c,1}$) bits $PL_{c,1}$ (n) among 4 ($B_{c,1}$) bits of the payload $PL_{c,1}$, 2 (F) bits $PL_{c,2}$ (n) among 4 ($B_{c,2}$) bits of the payload $PL_{c,2}$, and 1 ($F_{c,3}$) bit $PL_{c,3}$ (n) among 3 ($B_{c,3}$) bits of the payload $PL_{c,3}$. In addition, in accordance with the period $T_c$ of the payload class, in the second frame (Frame m+$T_c$), the bit level multiplexing unit 305 merges 4 ($F_{c,1}$) bits $PL_{c,1}$ (n+1) among 4 ($B_{c,1}$) bits of the payload $PL_{c,1}$, 2 ($F_{c,2}$) bits $PL_{c,2}$ (n) among 4 ($B_{c,2}$) bits of the payload $PL_{c,2}$, and 1 ($F_{c,3}$) bit $PL_{c,3}$ (n) among 3 ($B_{c,3}$) bits of the payload $PL_{c,3}$. Hereinafter, the above-described processes are repeated.

At this time, 4 ($F_{c,1}$) bits $PL_{c,1}$ (n) that are merged with the first frame (Frame m) are different from 4 ($F_{c,1}$) bits $PL_{c,1}$ (n+1) that are merged with the second frame (Frame m+$T_c$). In addition, if 2 ($F_{c,2}$) bits $PL_{c,2}$ (n) that are merged with the first frame (Frame m) are added to 2 ($F_{c,2}$) bits $PL_{c,2}$ (n) that are merged with the second frame (Frame m+$T_c$), it becomes the payload $PL_{c,2}$. Further, if summing 1 ($F_{c,3}$) bit $PL_{c,3}$ (n) merged with the first frame (Frame m), 1 ($F_{c,3}$) bit $PL_{c,3}$ (n) merged with the second frame (Frame m+$T_c$), and 1 ($F_{c,3}$) bit $PL_{c,3}$ (n) merged with the third frame (Frame m+2$T_c$), it becomes the payload $PL_{c,3}$.

Through the above-described processes, the bit level multiplexer 305 performs multiplexing such that $B_{c,t}$ bits constituting each payload $PL_{c,t}$ belonging to a payload class are transmitted over a frame that corresponds to a feedback period $T_{c,t}$ of each payload. At this time, the length $F_c$ of a bit sequence of a multiplexing payload for a payload class is in accordance with Equation 6.

$$F_c = \sum_t \{F_{c,t}\} \quad \text{(Equation 6)}$$

Since the mobile terminal 300 performs multiplexing on the basis of the feedback channel allocation information P100 transmitted by the base station, the base station can reconstruct the payloads that belong to the payload class, on the basis of the feedback channel allocation information P100. That is, the base station can restore the payloads in a reverse process of a bit level multiplexing process of the payload class in the mobile terminal 300.

Referring to FIG. 8 again, a description is given to a method in which a mobile terminal 300 according to an exemplary embodiment of the present invention transmits feedback information to a base station.

The block coding unit 307 of the mobile terminal 300 performs block coding on each multiplexing payload of at least one of multiplexing payloads according to the contents and length $F_c$ of a bit sequence constituting each multiplexing payload, and creates at least one codeword that corresponds to at least one multiplexing payload (Step S130). At this time, the number of symbols that constitute the codeword is the same as the number of tiles $N_c$ that are allocated for the corresponding payload class P109. Each symbol of the codeword may be one of $N_{sub}N_{sym}$ different symbols, and the number of types $N_{sub}N_{sym}$ that can be represented by each symbol is the same as the number of subcarriers $N_{sub}N_{sym}$ that constitute one tile 130. The block coding unit 307 can create the codeword by using a table illustrating a mapping relationship between the bit sequence of the multiplexing payload and the codeword. For this reason, it is required to prepare a table in which the length of each bit sequence is defined in advance.

Then, the orthogonal modulating unit 309 of the mobile terminal 300 individually performs orthogonal modulation on each codeword, and creates at least one orthogonal modulation codeword that corresponds to at least one codeword (Step S140). According to a process of performing orthogonal modulation on at least one codeword by the orthogonal modulating unit 309, each symbol constituting each codeword is converted into one of L Discrete Fourier Transform (DFT) codes composed of L chips such that each symbol is transmitted through one tile 130. The DFT codes that correspond to contents of symbols of the codewords are defined in advance, and a j-th chip $m_{i,j}$ of the i-th DFT code among the DFT codes is in accordance with Equation 7.

$$m_{i,j} = A \exp(2\pi j/L) \quad \text{(Equation 7)}$$

Here, A denotes amplitude of a DFT code chip,
$L = N_{sub} N_{sym}$,
i=0, 1, 2, . . . and L−1, and
j=0, 1, 2, . . . and L−1

One DFT code is transmitted through one tile 130, and each chip that constitutes the DFT code is transmitted from each subcarrier of the tile 130. That is, the DFT code, which has $L(=N_{sub}N_{sym})$ chip lengths, is transmitted through the tile 130 that is composed of $N_{sub}N_{sym}$ subcarriers. Further, $N_c$ symbols that constitute each codeword are transmitted by using the $N_c$ DFT codes in the $N_c$ tiles.

The different payload classes use different tiles, and are sequentially transmitted through the tiles that are allocated to the payload classes according to an order that is indicated by the feedback channel allocation information P100 in $N_{FB,u}$ tiles that correspond to the feedback channels allocated to the mobile terminals.

Then, the tile multiplexer 311 of the mobile terminal 300 performs tile multiplexing on at least one of orthogonal modulation codewords, and creates tile multiplexing symbols (Step S150). The tile multiplexer 311 performs tile multiplexing on the basis of a period $T_c$ of each payload class and the number of tiles $N_c$ in each payload class.

Next, referring to FIG. 10, a description is given to a process in which the tile multiplexer multiplexes payload classes $PLC_1$ and $PLC_2$ are transmitted through the feedback channels of the mobile terminal with one tile multiplexing symbol.

FIG. 10 is a flowchart illustrating a process in which a tile multiplexer according to an exemplary embodiment of the present invention creates a tile multiplexing symbol.

As shown in FIG. 10, the block coding unit 307 performs block coding on a multiplexing payload of 1 bit ($F_1$) corresponding to a payload class $PLC_1$ and converts it into a codeword composed of 8 ($N_1$) symbols, and performs block coding on a multiplexing payload of 7 bits ($F_2$) corresponding to the payload class $PLC_2$ and converts it into a codeword composed of 40 ($N_2$) symbols (Step S130).

Then, the orthogonal modulating unit 309 modulates a codeword composed of 8 ($N_1$) symbols with a DFT code so as to create an orthogonal modulation symbol composed of 8 ($N_1$) tiles, and modulates a codeword composed of 40 ($N_2$) symbols with the DFT code so as to create an orthogonal modulation symbol composed of 40 ($N_2$) tiles (Step S140).

Then, the tile multiplexer 311 determines a period T of a feedback channel that is allocated to the mobile terminal 300 (Step S151). At this time, the period T of the feedback channels may have a minimum value among periods $T_c$ of payload classes. That is, when a period $T_1$ of the payload class $PLC_1$ is two frames and a period $T_2$ of a payload class $PLC_2$ is four frames, the tile multiplexer 311 determines the period T of the feedback channel as two frames according to the period $T_1$ of the payload class $PLC_1$.

Then, on the basis of the period T of the feedback channel, a period $T_c$ of each payload class, and the number of tiles $N_c$ in each payload class, the tile multiplexer 311 determines the number of tiles $X_c$ that each payload class transmits for each period of the feedback channel (Step S153). At this time, the number of tiles $X_c$ is in accordance with Equation 8.

$$X_c = N_c T/T_c \quad \text{(Equation 8)}$$

In accordance with Equation 8, the number of tiles $X_1$ in the payload class $PLC_1$ is eight, and the number of tiles $X_2$ in the payload class $PLC_2$ is twenty.

Here, when the base station allocates a feedback channel to the mobile terminal 300, the base station can set the number of tiles $N_c$ in each payload class and a period $T_c$ of each payload class such that the number of tiles $X_c$ becomes a natural number.

Further, the base station may allocate the number of tiles $X_c$ such that the number of tiles $X_c$ does not become a natural number. In this case, the tile multiplexer 311 may add $DN_c$ tiles to $N_c$ tiles. At this time, the number of added tiles $DN_c$ is in accordance with Equation 9.

$$\Delta N_c = \lceil N_c T/T_c \rceil T/T_c - N_{c,t} \quad \text{(Equation 9)}$$

In accordance with Equation 9, the tile multiplexer 311 may allow the payload class $PLC_c$ to use $N_c'$ tiles obtained by adding the $DN_c$ tiles to the $N_c$ tiles, and then perform tile multiplexing. At this time, $N_c'$ is in accordance with Equation 10.

$$N_c' = N_c \Delta N_c \quad \text{(Equation 10)}$$

The tile multiplexer 311 may sequentially retransmit $DN_c$ DFT codes of a front side among $N_c$ DFT codes in the added tiles.

Then, with respect to an orthogonal modulation codeword that corresponds to each payload class $PLC_c$, the tile multiplexer 311 merges tiles corresponding to the number of tiles $X_c$ in each payload class among tiles constituting each orthogonal modulation codeword, and creates a tile multiplexing symbol for each period T of a feedback channel (Step S155).

That is, in the first frame (Frame m), the tile multiplexing unit 311 merges 8 ($X_1$) tiles $PLC_1$ (n) among orthogonal modulation symbols that are composed of 8 ($N_1$) tiles, and 20 ($X_2$) tiles $PLC_2$ (n) among orthogonal modulation symbols that are composed of 40 ($N_2$) tiles. In addition, in accordance with the period T of the feedback channel, in the second frame (Frame m+T), the tile multiplexer 311 merges 8 ($X_1$) tiles $PLC_1$ (n+1) among orthogonal modulation symbols that are composed of 8 ($N_1$) tiles and 20 ($X_2$) tiles $PLC_2$ (n) among orthogonal modulation symbols that are composed of 40 ($N_2$) tiles. Hereinafter, the above-described processes are repeated.

At this time, the 8 ($X_1$) tiles $PLC_1$ (n) that are merged with the first frame (Frame m) are different from the 8 ($X_1$) tiles $PLC_1$ (n+1) that are merged with the second frame (Frame m+T). The 20 ($X_2$) tiles $PLC_2$ (n) that are merged with the first frame (Frame m) and the 20 ($X_2$) tiles $PLC_2$ (n) that are merged with the second frame (Frame m+T) are summed, which becomes orthogonal modulation symbols that are composed of 40 ($N_2$) tiles.

Through the above-described processes, the tile multiplexer 311 performs multiplexing such that $N_c$ tiles constituting orthogonal modulation symbols of each payload class $PLC_c$ are transmitted during a period of each payload class $PLC_c$.

The tile multiplexer 311 may set a transmission power with respect to each payload class $PLC_c$. If the tile multiplexer 311 sets a transmission power of an orthogonal modulation symbol that corresponds to each payload class $PLC_c$, the tile multiplexer 311 can set a transmission power for each payload class $PLC_c$. The tile multiplexer 311 determines a transmission power for each payload class $PLC_c$ on the basis of a power offset P107 of feedback channel allocation information P100. At this time, a transmission power $P_c$ for each payload class $PLC_c$ is in accordance with Equation 2.

Referring to FIG. 8 again, a description is given to a method in which a mobile terminal 300 according to an exemplary embodiment of the present invention transmits feedback information to a base station.

The tile permutating unit 313 of the mobile terminal 300 performs tile permutation such that an order of multiplexed tiles of tile multiplexing symbols is changed, and creates tile permutation symbols (Step S160). Through this process, the tile permutating unit 313 causes continuous logical tiles of the tile multiplexing symbols to be mapped with physical tiles that are distant from one another.

Then, the scrambling unit 315 of the mobile terminal 300 scrambles the tile permutation symbols and creates channel code applying symbols (Step S170). The scrambling unit 315 can apply a scrambling code corresponding to a channel code of the feedback channel allocated to the mobile terminal 300 to the tile permutation symbol so as to create a channel code applying symbol.

When a plurality of mobile terminals 300 performs frequency/time multiplexing on a payload according to the feedback channel allocation information P100, a plurality of feedback channels that are allocated to the plurality of mobile terminals use different tiles in an entire feedback zone, and thus are discriminated from one another. The plurality of mobile terminals 300 that are allocated with the feedback channels included in the same feedback zone 110 can use the same scrambling codes. Each of the scrambling codes may be defined in advance by an ID of a corresponding sector, a frame number, an OFDM symbol number, and the like.

When the plurality of mobile terminals 300 perform code division multiplexing on a payload according to the feedback channel allocation information P200, the plurality of feedback channels that are allocated to the plurality of mobile terminals 300 use the same tiles 130 in the feedback zone 110. In order to discriminate the feedback channels of the plurality of mobile terminals 300, the plurality of mobile terminals 300 may use different scrambling codes. Each of the scrambling codes may be defined in advance by an ID of a corresponding sector, a frame number, an OFDM symbol number, an ID allocated to the mobile terminal, an ID of the feedback channel, and the like.

Then, the transmitting unit 317 of the mobile terminal 300 transmits a channel code applying symbol to the base station through the feedback zone 110 of the uplink frame 100 for each period T of the feedback channel (Step S180). The transmitting unit 317 can set a frame number from which the feedback channel starts according to an uplink frame number P101 of the feedback channel allocation information P100.

When the mobile terminal 300 performs frequency/time multiplexing on a payload according to the feedback channel allocation information P100, the transmitting unit 317 can transmit each of channel code applying symbols through tiles corresponding to a bit map P119 of the feedback channel allocation information P100.

When the mobile terminal 300 performs code division multiplexing on a payload according to the feedback channel allocation information P200, the transmitting unit 317 can transmit the channel code applying symbols by using all the tiles 130 of the feedback zone 110.

Next, referring to FIGS. 11 and 12, a description is given to a method in which a mobile terminal 300 according to an exemplary embodiment of the present invention transmits feedback information to a base station.

FIG. 11 is a flowchart illustrating a method in which a mobile terminal according to an exemplary embodiment of the present invention transmits a non-periodic payload.

The base station can allow the mobile terminal 300 to use an intermittently transmitted additional feedback channel instead of a periodic feedback channel with respect to feedback information in which feedback that is not periodic but intermittent is required.

By using the feedback channel allocation information P100, the base station can allow the mobile terminal 300 to transmit non-periodic feedback information. In order to transmit the non-periodic feedback information, the base station defines a type of a specific payload P115 as a non-periodic payload in advance, and defines the specific payload class of the feedback channel allocation information P100 such that the specific payload class includes the non-periodic payload. Further, the base station defines a power offset P107 for a payload class including the non-periodic payload, and a feedback period P117 of the non-periodic payload.

The feedback period that is defined for the non-periodic payload does not mean a periodic feedback period but a restriction in a maximum reporting ratio in which the non-periodic payload can be transmitted. For example, when a feedback period of 10 frames is defined with respect to the non-periodic payload in the feedback channel allocation information P100, it means that the corresponding non-periodic payload cannot be transmitted at intervals that are smaller than 10 frames. This restriction is used to restrict an increase in interference due to the non-periodic payload transmission.

As shown in FIG. 11, first, the feedback channel allocation information receiving unit 301 of the mobile terminal 300 receives the feedback channel allocation information P100 from the base station (Step S300).

Then, in accordance with the payload information P113 of the feedback channel allocation information P100, the payload generator 303 of the mobile terminal 300 creates a non-periodic payload corresponding to a type of a specific payload P115 on the basis of a feedback period P117 of the non-periodic payload (Step S310).

Then, in accordance with the contents and length $B_{c,t}$ of the bit sequence that constitutes the non-periodic payload, the block coding unit 307 of the mobile terminal 300 performs block coding and creates a non-periodic codeword that corresponds to the non-periodic payload (Step S320). The non-periodic codeword is composed of $N_c$ symbols according to the number of tiles P109 in the payload class $PLC_c$ to which the non-periodic payload belongs.

Then, the orthogonal modulating unit 309 of the mobile terminal 300 performs orthogonal modulation on the non-periodic codeword, and creates a non-periodic orthogonal modulation codeword that corresponds to the non-periodic codeword (Step S330). The non-periodic orthogonal modulation codeword is composed of $N_c$ tiles.

Then, the tile permutating unit 313 of the mobile terminal 300 performs tile permutation such that an order of tiles of the non-periodic orthogonal modulation codeword is changed, and creates a non-periodic tile permutation symbol (Step S340).

Then, the scrambling unit 315 of the mobile terminal 300 scrambles the non-periodic tile permutation symbol and creates an additional channel code applying symbol (Step S350). The scrambling unit 315 can apply a scrambling code corresponding to a channel code of the additional feedback channel allocated to the mobile terminal 300 to the non-periodic tile permutation symbol and create an additional channel code applying symbol.

At this time, the scrambling unit 315 can apply a code, which is obtained by performing conjugation or symbol inversion on a scrambling code used for a basic feedback channel, to a non-periodic tile permutation symbol, such that the non-periodic payload is transmitted through the additional feedback channel. Further, the scrambling unit 315 can use codes that individually correspond to the scrambling codes that are used for the basic feedback channel.

Then, the transmitting unit 317 of the mobile terminal 300 transmits the additional channel code applying symbol to the base station through the additional feedback channel (Step S360).

Next, referring to FIG. 12, the description is given to a method in which a mobile terminal transmits an additional feedback channel to a base station.

FIG. 12 is a view illustrating a method in which a mobile terminal according to an exemplary embodiment of the present invention transmits a non-periodic payload through an additional feedback channel.

As shown in FIG. 12, when the non-periodic payload needs to be transmitted, the mobile terminal 300 allows the additional feedback channel for the non-periodic payload to use tiles corresponding to the number of tiles allocated to the additional feedback channel, among tiles used by the basic feedback channel in the frame through which the basic feedback channel is transmitted. At this time, the mobile terminal 300 performs code multiplexing on the additional feedback channel and the basic feedback channel through the scrambling code for the additional feedback channel in the same tile as the basic feedback channel.

The exemplary embodiment of the present invention that has been described above may be implemented by not only a method and an apparatus but also a program capable of realizing a function corresponding to the structure according to the exemplary embodiment of the present invention and a recording medium having the program recorded therein. It can be understood by those skilled in the art that the implementation can be easily made from the above-described exemplary embodiment of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment of the present invention, the mobile terminal can construct adaptive feedback channels according to a channel condition and an amount of feedback required, and can efficiently use a radio resource for feedback channels.

Further, according to the exemplary embodiment of the present invention, the mobile terminal can efficiently multiplex various feedback payloads that require different feedback periods and reliabilities.

The invention claimed is:

1. A method of transmitting feedback information, comprising:
   receiving, in one frame, channel allocation information that includes classification information for classifying a plurality of payloads into a plurality of classes corresponding to feedback information, information on a plurality of types of transmission periods, each transmission period type from among the plurality of the types of transmission periods respectively corresponding to each class of the feedback information from among the plurality of classes, and information on the number of tiles respectively corresponding to each class of the feedback information from among the plurality of classes;
   multiplexing the plurality of payloads for each of the plurality of classes in accordance with the classification information, the information on the plurality of transmission periods, and the information on the number of the plurality of tiles that are included in the channel allocation information to create a plurality of tile groups corresponding to each of the plurality of classes for periods of the plurality of classes according to the plurality of transmission periods;
   multiplexing the plurality of tile groups on the basis of the periods of the plurality of classes and the information on the number of the plurality of tiles to create a multiplexed tile group for each of feedback periods according to the periods of the plurality of classes; and
   transmitting the multiplexed tile group to a base station through a feedback zone of a frame that corresponds to the feedback periods.

2. A method of transmitting feedback information comprising:
   receiving, in one frame, channel allocation information that includes classification information for classifying a plurality of payloads into a plurality of classes corresponding to feedback information, information on a plurality of types of transmission periods, each transmission period type from among the plurality of the types of transmission periods respectively corresponding to each class of the feedback information from among the plurality of classes, information on the number of tiles respectively corresponding to each class of the feedback information from among the plurality of classes, and bitmap information indicating locations of the tiles;
   creating the plurality of payloads for the plurality of transmission periods;
   multiplexing the plurality of payloads for the plurality of classes in accordance with the classification information, the information on the plurality of transmission periods, and the information on the number of the plurality of tiles that are included in the channel allocation information, to create a plurality of tile groups corresponding to each of the plurality of classes for periods of the plurality of classes according to the plurality of transmission periods;
   multiplexing the plurality of tile groups on the basis of the periods of the plurality of classes and the information on the number of the plurality of tiles to create a multiplexed tile group for each of feedback periods; and
   transmitting the multiplexed tile group to a base station through the tiles according to the bitmap information in a feedback zone of a frame that corresponds to the feedback periods.

3. The method of claim 2, further comprising:
   applying a channel code to the multiplexed tile group;
   transmitting the multiplexed tile group to which the channel code is applied to the base station through a portion of tiles of the feedback zone according to the bitmap information in the feedback zone of the frame that corresponds to the feedback periods,
   wherein the plurality of payloads includes a non-periodic payload in which a value indicating a transmission period is not constant and a class to which the non-periodic payload belongs is a non-periodic class;
   performing block coding on the non-periodic payload so as to create a non-periodic codeword;
   performing orthogonal modulation on the non-periodic codeword according to the information on the number of tiles corresponding to the non-periodic class so as to create a non-periodic tile group;
   applying an additional channel code that is obtained by performing conjugation or symbol inversion on the channel code, to the non-periodic tile group; and
   transmitting the non-periodic tile group to which the additional channel code is applied to the base station through a portion of the feedback zone in accordance with the bit map information in the feedback zone of the frame that corresponds to the feedback periods.

4. A method of transmitting feedback information, comprising:
   receiving, in one frame, channel allocation information that includes classification information for classifying a plurality of payloads into a plurality of classes corresponding to feedback information, information on a plurality of types of transmission periods, each transmission period type from among the plurality of types of transmission periods respectively corresponding to each class of the feedback information from among the plurality of classes, and information on the number of tiles respectively corresponding to each class of the feedback information from among the plurality of classes;

creating the plurality of payloads for the plurality of transmission periods;

multiplexing the plurality of payloads for each of the plurality of classes in accordance with the classification information, the information on the plurality of transmission periods, and the information on the number of the plurality of tiles that are included in the channel allocation information, to create a plurality of tile groups corresponding to each of the plurality of classes for periods of the plurality of classes according to the plurality of transmission periods;

multiplexing the plurality of tile groups on the basis of the periods of the plurality of classes and the information on the number of the plurality of tiles to create a multiplexed tile group for each of feedback periods;

applying a channel code to the multiplexed tile group; and transmitting the multiplexed tile group to which the channel code is applied to a base station through a feedback zone of a frame that corresponds to the feedback periods.

5. The method of claim 4, further comprising:

performing block coding on a non-periodic payload so as to create a non-periodic codeword, the plurality of payloads including the non-periodic payload in which a value indicating a transmission period is not constant, a class to which the non-periodic payload belongs being a non-periodic class;

performing orthogonal modulation on the non-periodic codeword in accordance with the information on the number of tiles that corresponds to the non-periodic class to created a non-periodic tile group;

applying an additional channel code that is obtained by performing conjugation or symbol inversion on the channel code to the non-periodic tile group; and transmitting the non-periodic tile group to which the additional channel code is applied to the base station through the feedback zone of the frame that corresponds to the feedback periods.

6. The method of claim 5, further comprising setting a transmission power for each of the plurality of classes according to information on a plurality of transmission powers, wherein the channel allocation information further includes the information on the plurality of transmission powers that correspond to each of the plurality of classes.

7. The method of claim 6, wherein the multiplexing of the plurality of payloads includes:

multiplexing the plurality of payloads for each of the plurality of classes according to the classification information, to create a plurality of multiplexing payloads corresponding to each of the plurality of classes for periods of the plurality of classes;

performing block coding on each of the plurality of multiplexing payloads so as to create a plurality of codewords; and performing orthogonal modulation on each of the plurality of codewords in accordance with the information on the number of the plurality of tiles so as to create a plurality of tile groups.

8. The method of claim 7, further comprising determining each of the periods of the plurality of classes as a minimum value among transmission periods of at least one of the payloads that belong to each of the plurality of classes.

9. The method of claim 8, wherein the multiplexing of each of the plurality of classes includes:

determining the number of bits by which each payload belonging to each class is to be transmitted for each period of each class on the basis of a transmission period of at least one of the payloads belonging to each class and a period of each class; and merging bits corresponding to the number of bits of each payload among one or more bits constituting each payload belonging to each class for each class to create a multiplexed payload.

10. The method of claim 9, wherein in the determining of the number of bits, the number of bits is determined by a ratio between a transmission period of at least one of the payloads belonging to each class and a period of each class.

11. The method of claim 8, further comprising determining the feedback period as a minimum value among the periods of the plurality of classes.

12. The method of claim 11, wherein the creating of the multiplexed tile group includes:

determining the number of tiles used by each tile group for each feedback period on the basis of a period of each class and the information on the number of tiles for each class; and merging tiles corresponding to the number of tiles used by each tile group among tiles constituting each tile group for each feedback period so as to create the multiplexed tile group for each feedback period.

13. The method of claim 12, wherein, in the determining of the number of tiles, the number of tiles is determined by a ratio between a period of each class and the feedback period.

14. The method of claim 6, wherein the feedback zone includes a plurality of tiles, and each tile includes a plurality of symbols on a time axis and a plurality of subcarriers on a frequency axis.

* * * * *